United States Patent [19]  [11]  4,136,255
Franks  [45]  Jan. 23, 1979

[54] PROCESS FOR MAKING SOLUTIONS OF CELLULOSIC COMPOUNDS

[75] Inventor: Neal E. Franks, Enka, N.C.

[73] Assignee: Akzona Incorporated, Asheville, N.C.

[21] Appl. No.: 838,843

[22] Filed: Oct. 3, 1977

[51] Int. Cl.² ........................ C08B 9/04; C08B 16/00
[52] U.S. Cl. ...................................... 536/60; 106/164;
   106/165; 106/168; 536/57
[58] Field of Search ............... 106/164, 165, 198, 168,
   106/169; 536/57, 60, 101

[56] References Cited

U.S. PATENT DOCUMENTS

| | | | |
|---|---|---|---|
| 2,499,010 | 2/1950 | Weeldenburg | 536/101 |
| 2,852,334 | 9/1958 | Hollihan et al. | 106/165 |
| 3,148,106 | 9/1964 | Mitchell et al. | 536/101 |
| 3,600,379 | 8/1971 | Sihtola et al. | 106/164 |
| 3,670,069 | 6/1972 | Mitchell et al. | 264/187 |
| 3,728,330 | 4/1973 | Sihtola et al. | 106/164 |
| 3,865,918 | 2/1975 | Mitchell et al. | 264/187 |
| 3,903,076 | 9/1975 | Krumel et al. | 536/85 |
| 3,914,130 | 10/1975 | Newcomer | 106/164 |

FOREIGN PATENT DOCUMENTS 52-40589  3/1977  Japan ........................ 536/101

Primary Examiner—Ronald W. Griffin
Attorney, Agent, or Firm—Francis W. Young; Jack H. Hall

[57] ABSTRACT

A solution of cellulose or cellulose derivative suitable for spinning, extruding or other shaping process is prepared by steeping unaged cellulose or a cellulosic derivative a plurality of times, consecutively, subsequently shredding and then aging prior to xanthation or the like. The concentration of alkali metal hydroxide of the solution used for resteeping is lower than that in the first steeping step. The process produces a viscose with less carbon disulfide than the conventional process without reduction in yield of cellulose. The process is adaptable for steeping in conventional press steeping apparatus or slurry steeping apparatus.

8 Claims, 1 Drawing Figure

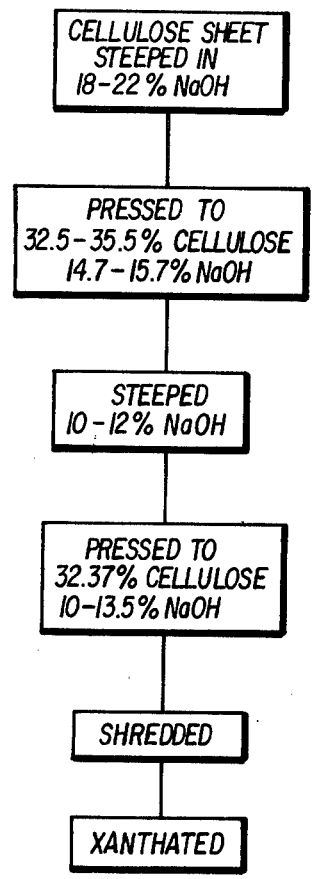

PROCESS FOR MAKING SOLUTIONS OF CELLULOSIC COMPOUNDS

This invention relates generally to cellulosic materials and, more particularly, to a method for making solutions of cellulosic compounds and shaped cellulosic articles made therefrom.

As described in U.S. Pat. No. 3,600,379 the conventional process for preparing viscose involves the following series of steps:

(1) High alpha cellulose as wood pulp, cotton linters or the like is steeped as a sheet or as a slurry in an aqueous solution containing sodium hydroxide.

(2) Excess steeping liquor is removed from the resulting alkali cellulose by pressing to remove excess solution and to provide a product containing from about 30 to about 35 percent cellulose and 15–17% by weight sodium hydroxide.

(3) The alkali cellulose is shredded and aged for 25 hours or more.

(4) The aged product is xanthated with carbon disulfide.

(5) The xanthated product is dissolved in sodium hydroxide to form a viscose which is ripened, filtered and spun or otherwise shaped into a cellulosic article.

In accordance with the disclosure in the patent, the conventional process is modified to provide for steeping the alkali cellulose after it has been aged. In other words, the patented process (sometimes hereinafter referred to as the "SINI" process) involves a series of steps which includes the conventional steeping, pressing, shredding and aging steps followed by at least one additional steeping step, pressing and shredding prior to xanthation. In accordance with the disclosure, the sodium hydroxide used in the second steeping step is lower than 15% by weight and the alkali cellulose is pressed so that the second alkali cellulose contains less than 15% by weight sodium hydroxide. It is indicated in the patent that less carbon disulfide is consumed in the xanthation because the alkali cellulose contains less sodium hydroxide and the xanthation temperature may be higher to reduce the xanthation time. However, it has been noted in practice that the yield of cellulose is lower with the modified process than with the conventional process and that the modified process cannot be practiced in existing plants which have only steeping presses with no facility for slurry steeping. The inventors have described their modified process in an article entitled "Chemistry of the Sini Viscose Process" in *Cellulose Chemistry and Technology* 6, 71–83 (1972).

It is therefore an object of this invention to provide a process for making solutions of cellulosic materials which is advantageous over the aforesaid modified process. Another object of the invention is to provide a process for making viscose which can be practiced with steeping in the conventional presses or with slurry steeping. Still another object of the invention is to provide a process for making viscose in improved yields in shorter xanthation and viscose ripening times.

Still another object is to provide a process whereby increased yield of cellulose are obtained with lower amounts of carbon disulfide and fewer handling steps.

Still another object is to provide a process that is adaptable and equally advantageous to derivatives of cellulose.

Other objects will become apparent from the following description with reference to the accompanying drawing which is a flow sheet illustrating one embodiment of the invention.

The foregoing objects and others are accomplished in accordance with this invention, generally speaking, by providing a process for making cellulosic derivatives wherein cellulose is steeped in a solution containing an alkali metal hydroxide as in the heretofore described conventional process and then steeped at least one more time in a solution containing less sodium hydroxide than the first steeping solution, pressed to remove the excess alkali hydroxide, shredded, and then aged for the first time. The cellulosic compound employed may be a standard wood pulp used for dissolving purposes or cotton linters.

By postponing aging of the alkali cellulose until after two or more steepings in aqueous caustic solution, the loss in yield of cellulose is significantly reduced and the amount of carbon disulfide required in preparing viscose can be less than that required in a conventional process like that described above. Further, the use of a consecutive process described hereinabove allows fewer handling steps of the alkali cellulose and a smoother mechanical flow in the process. Moreover, the process is adaptable for using the press-type steeping apparatus as well as a stirred vessel for slurry steeping. The combination of the two types of steeping in the abovementioned order is preferred because of improved equilibration of NaOH at the lower concentration, i.e., more uniform dispersion and better diffusion of alkali into the cellulose.

Although described in terms of cellulose xanthate, similar advantages can be realized for "other cellulose derivatives" which can be made in like manner. Therefore, when Applicant refers to viscose, it is intended to include alkali solutions of cellulose as well as cellulose ether derivatives such as those mentioned hereinbelow and fibrous alkyl or hydroxyalkyl cellulose products are intended to be included within the terms, regenerated cellulosic material or cellulosic material. These would include methyl cellulose, ethyl cellulose, hydroxyethylcellulose, hydroxypropylcellulose, cyanoethylcellulose, or combinations of these ethers like methyl hydroxypropyl cellulose. The preparation and uses of such products are well known and have been detailed in the literature, such as U.S. Pat. Nos. 3,903,076; 3,670,069 and 3,865,918. These materials can be used in the invention and can be spun according to said Patents 3,670,069 and 3,865,918. Cellulose ethers are useful, in addition to making shaped articles, as viscosity control agents for various coatings applications, e.g., in paints, gels, lacquers, and in binders, emulsifiers, etc. The presence of lesser amounts of alkali metal hydroxides as provided in the invention is advantageous since these reaction mixtures need to be neutralized before recovery of the desired cellulose ether.

The concentration of the solutions used for steeping the cellulosic compound may vary, but are preferably about 18–22% NaOH based on the weight of the solution with the remainder being water, in the first steeping step and lower NaOH concentration in the additional steeping steps. For example, the last steeping solution should contain from about 10–12% by weight NaOH and 90–88% water. A more preferred range of NaOH based on the weight of the solution for the first steeping step is from 18 to 19%.

After the first steeping step, the wet sheet is pressed to reduce the amount of liquid to obtain an intermediate product containing from about 32.5% cellulose, about 14.7-15.7% NaOH and the remainder water. After the last steeping step, and usually only two steeping steps will be needed, the wet sheet of cellulosic material is pressed to reduce the amount of liquid to provide a product containing from about 32 to about 37% by weight cellulose, about 10 to about 13.5% by weight NaOH and the remainder water. This product is then shredded to form a crumb and aged preferably at ambient temperature or greater for from about 20 to about 45 hours, reacted with carbon disulfide, and dissolved in dilute aqueous sodium hydroxide. The resulting solution of the cellulose derivative should have low gel/fiber ratio to help assure easy filtration in the subsequent processing steps. Potassium hydroxide may be substituted for the sodium hydroxide.

In the following examples all parts and percentages are by weight unless otherwise stated. Procedure for determining number of gels and fibers in viscose is as follows:

Apparatus
1. Mix the viscose sample well with stirring rod and fill the depression in a hanging drop slide having a frosted surface and polished depression 1.75 mm deep and 17 mm diameter (¼ cc volume) with viscose and cover with cover glass. The sample must be free of air bubbles.
2. Place the slide on the stage of a polarizing microscope with KPL 16× eyepieces and 10× plan achromat objective.
3. Rotate the analyzer to the position where the field is darkest (i.e., the position of crossed polars).
4. Using 16× eyepieces and 10× objective, count gels and fibers in entire depressed area and record number in each category.
5. The number of gels/cc is the gels counted multiplied by 4. The number of fibers/cc is the fibers counted multiplied by 4.

EXAMPLE 1

About 25 pounds of wood pulp sheet having an alpha cellulose content of 96.8% is steeped in an aqueous solution of 18.8% NaOH at 23° C. for about 45 minutes. The resulting alkali cellulose is pressed to provide a sheet containing about 34.6% cellulose, about 15.5% NaOH, and the rest being water.

The pressed sheet is resteeped without aging in the same steeping press in an aqueous solution containing about 10% NaOH at 23° C. for about 30 minutes, pressed and shredded at 26° C. to yield 63.5 pounds of alkali cellulose containing about 36% cellulose, about 13.7% NaOH and the balance water. The resulting crumbs are aged about 25 hours at 26° C.

The aged alkali cellulose is xanthated at a beginning temperature of 28° C. in a barratte to which 2.1 kg. (20.23%) carbon disulfide is added. The resulting cellulose xanthate is dissolved in dilute NaOH at less than 15° C. for 90 minutes to form a viscose having a dissolving viscosity of 170 ball fall seconds (bfs.) The viscose solution contains about 9.6% cellulose, 4.5% NaOH and 1.7% sulfur.

EXAMPLE 2

(Comparative Example)

About 25 pounds of wood pulp from the same lot as that used in Example 1 is steeped in an aqueous solution of 18.8% NaOH at 23° C. for about 45 minutes. The resulting alkali cellulose is pressed to provide a sheet containing about 34.6% cellulose, about 15.5% NaOH and the rest water. The yield of alkali cellulose sheets is about 66 pounds. The resulting alkali cellulose sheets are aged 25 hours at 26° C. with precautions exercised to exclude air by wrapping the sheets in plastic film. The aged sheets are then steeped for about 30 minutes in an aqueous solution of 12% NaOH at 23° C. The sheets are pressed and shredded to provide a product containing about 35% cellulose, about 13% NaOH and the balance water. The yield of shredded alkali cellulose is 62.5 pounds. The crumbs are xanthated immediately after shredding using 2.1 kg. (21%) carbon disulfide as in Example 1.

After dissolving in the fashion outlined in Example 1, the viscosity of the viscose is 170 bfs. The viscose contained about 8.8% cellulose, 4.3% NaOH, and about 1.57% sulfur.

EXAMPLE 3

About 25 pounds of wood pulp sheet having an alpha cellulose content of 96.8% is steeped in an aqueous solution of 18.8% NaOH at 16° C. for about 0.75 hours. The resulting alkali cellulose is separated from the solution and pressed to provide a sheet containing about 34.6% cellulose, about 15.5% NaOH and the remainder water.

The pressed sheet is steeped without aging in an aqueous solution containing about 10% NaOH at 21° C. for about 0.5 hours, pressed and shredded to provide a shredded product containing about 34.3% cellulose, about 13.4% NaOH and the balance water. The resulting crumbs are aged about 28 hours at 26° C. The yield of alkali cellulose is about 67 pounds. The alkali cellulose crumbs are xanthated using 2.3 kg. (22%) carbon disulfide; dissolution of the xanthated alkali cellulose is performed as in Example 1 to form a viscose having a dissolving viscosity of 120 bfs. The viscose solution contains about 8.98% cellulose, 4.6% NaOH and 1.64% sulfur. The gel/fiber ratio was 604/576.

EXAMPLE 4

(Comparative Example)

About 25 pounds of wood pulp from the same lot as that used in Example 3 is steeped in an aqueous solution of 18.8% NaOH at 16° C. for about 0.75 hours. The resulting alkali cellulose is pressed to provide a sheet containing about 34.6% cellulose, about 15.5% NaOH and the remainder water. The resulting alkali cellulose sheet is aged for about 28 hours at 25° C. The yield of alkali cellulose is about 69 pounds.

The aged sheet is steeped for about 0.5 hours in an aqueous solution of 12% NaOH at 23° C. The sheet is pressed and shredded to provide a product containing about 34.85% cellulose, about 13.1% NaOH and the balance water. The crumbs are xanathated using 2.3 kg. (22.3%) carbon disulfide. The yield of shredded alkali cellulose prior to xanthation is 65 pounds.

After dissolving the cellulose xanthate as outlined in Example 1, the viscosity of the viscose is 144 bfs. The viscose contains about 8.74% cellulose, about 4.69% NaOH and about 1.62% sulfur. The gel to fiber ratio is 240/308.

EXAMPLE 5

About 25 pounds of wood pulp sheet having an alpha cellulose content of 96.8% is steeped in an aqueous solution of 18.8% NaOH at 16° C. for about 0.75 hours. The resulting alkali cellulose is pressed to provide a sheet containing about 34.6% cellulose, about 15.5% NaOH and the remainder water.

The pressed sheet is resteeped, without aging, in an aqueous solution containing about 10% NaOH at 23° C. After pressing, shredding was performed with addition of 0.1% Pluronic L-64 for 45 minutes. The alkali cellulose crumbs are aged about 28 hours at 26° C. The shredded alkali cellulose contains about 13.43% NaOH and 34.19% cellulose. The yield of alkali cellulose is about 67 pounds.

The alkali cellulose is xanthated using 2.3 kg. (22%) carbon disulfide. The cellulose was dissolved as above to form a viscose having a dissolving viscosity of 108 bfs. The viscose solution contains about 9.98% cellulose, 4.64% NaOH and 1.48% sulfur. The viscosity of neutralized alkali cellulose (before xanthation) in cuene $[\eta]_{0.5} = 3.2$. The gel to fiber ratio is 632/480.

EXAMPLE 6
(Comparative Example)

About 25 pounds of wood pulp from the same lot as that used in Example 5 is steeped in an aqueous solution of 18.8% NaOH at 16° C. for about 0.75 hours. The resulting alkali cellulose sheet is aged about 28 hours at 26° C. The yield of alkali cellulose is about 69 pounds.

The aged sheet is steeped for about 0.5 hours in an aqueous solution of 12% NaOH at 23° C. The sheet is pressed and shred to provide a sheet containing about 34.6% cellulose, about 13% NaOH and the balance water. The resulting crumbs are xanthated using 2.3 kg. (22%) carbon disulfide. The yield of shredded alkali cellulose prior to xanthation is 65.25 pounds.

The dissolving viscosity of the resulting viscose is 116 bfs. The viscose contains about 8.82% cellulose, about 4.95% NaOH and about 1.48% sulfur.

EXAMPLE 7

About 25 pounds of wood pulp sheet having an alpha cellulose of 96.8% is steeped in an aqueous solution of 18.8% NaOH at 16° C. for about 0.75 hours. The resulting alkali cellulose is pressed to remove the excess NaOH. While the sheets were still under compaction, aqueous 10% sodium hydroxide was introduced into the press. The pressure on the compacted sheets is released and the second steeping continues for 30 minutes at 23° C.

The alkali cellulose is pressed and shred to provide an alkali cellulose containing about 34.46% cellulose, about 12.7% NaOH and the balance water. The shredded material is aged about 45.5 hours at ambient temperature. The yield of alkali cellulose is about 66 pounds having an intrinsic viscosity $[\eta]_{0.5\%}$ cellulose in cuene of 2.76 at 25° C. after aging 45½ hours or equivalent to that obtained in comparative Example 8. It was surprisingly found that the aging rate remained the same as in Example 8 even when the second steeping step and succeeding ones (if done) were conducted immediately consecutively.

The alkali cellulose is xanthated using 2.27 kg. (22%) carbon disulfide; after dissolving, the viscose has a dissolving viscosity of 78 bfs. The viscose solution contains about 9.1% cellulose, 4.5% NaOH and 1.72% sulfur. The gel to fiber ratio is about 1304/752.

EXAMPLE 8
(Comparative Example)

About 25 pounds of wood pulp from the same lot as that used in Example 7 is steeped in an aqueous solution of 18.8% NaOH at 16° C. for about 0.75 hours. The resulting alkali cellulose is pressed to provide an alkali cellulose sheet which is aged about 45.5 hours at 26° C. The yield of alkali cellulose is about 69 pounds having an $[\eta]_{0.5\%}$ cuene - 25° C. of 2.80.

The aged sheet is resteeped for about 0.5 hours in an aqueous solution of 12% NaOH at 23° C. The sheet is pressed and shredded to provide crumbs containing about 34.72% cellulose, about 12.94% NaOH and the balance water. The crumbs are xanthated using 2.27 kg (22%) carbon disulfide. The yield of shredded alkali cellulose prior to xanthation is 64.5 pounds. The dissolving viscosity of the resulting viscose is 67 bfs. The viscose contains about 8.98% cellulose, about 4.6% NaOH and about 1.44% carbon disulfide. The gel/fiber ratio is about 784/352.

EXAMPLE 9

About 25 pounds of wood pulp sheet having an alpha cellulose content of 96.8% is steeped in an aqueous solution of 22% NaOH at 23° C. for 45 minutes. The excess NaOH is pressed out of the sheets; while still under pressure, 10% NaOH is admitted to the press over a 30 minute period. The pressure on the cellulose sheets is relaxed and this resteeping is continued for 30 minutes at 23° C. The excess NaOH is pressed from the sheets and the compacted sheets are shredded to yield 67 pounds of alkali cellulose crumbs containing 33.87% cellulose, 13.1% NaOH, with the remainder being water. This alkali cellulose is aged for 44 hours at 26° C.

The aged alkali cellulose crumbs are xanthated using 2.27 kg (22%) carbon disulfide. The cellulose xanthate is dissolved in dilute NaOH at a temperature less than 15° C. for 90 minutes. The viscosity of the viscose after dissolving is 71 bfs; the analysis is 8.9% cellulose, 4.66% NaOH and 1.55% sulfur. The gel/fiber count is 168/272.

The % yield of cellulose in the alkali cellulose crumbs obtained in the previous examples are tabulated below in Table I. Examples 1, 3, 5, 7 and 9 of the invention all get better yields than the comparative examples 2, 4, 6 and 8 using the modified process described in U.S. Pat. No. 3,600,379 referred to above.

TABLE I

| Example | Type Steeping | % Yield of Cellulose in Alkali Cellulose Crumbs |
| --- | --- | --- |
| 1 | Consecutive | 91.44 |
| 3 | Consecutive | 91.12 |
| 5 | Consecutive | 91.64 |
| 7 | Consecutive | 91.08 |
| 9 | Consecutive | 90.85 |
| 2 | SINI | 87.48 |
| 4 | SINI | 90.7 |
| 6 | SINI | 90.32 |
| 8 | SINI | 89.5 |

EXAMPLE 10

About 25 pounds of the dissolving pulp used in the earlier examples is steeped in an aqueous solution of 18.8% NaOH at 26.5° C. for 45 minutes. The excess NaOH is removed by pressing to yield a product comparable to the intermediate product mentioned in Example 7. While still under pressure, aqueous 9.9% NaOH is readmitted to the press; the pressure is relaxed and the second steeping continues for 30 minutes at 27° C. The sheets are repressed and shredded for 45 minutes with the addition of 0.1% Pluronic L-64 surfactant (a shredding aid) based on the weight of cellulose. The yield of alkali cellulose crumbs is 64 pounds containing 13.79% NaOH and 34.33% cellulose.

The shredded alkali cellulose preparation is aged for 46.5 hours at 26° C. The crumbs are then placed in a barratte which is evacuated to 22.5 inches vacuum. The starting temperature is 28° C; propylene oxide, 1500 ml (12.5% on weight of cellulose), is added over a 30 minute period. The vacuum drops upon addition of the propylene oxide and the reaction temperature increases during the course of the hydroxypropylation to 37° C. The reaction is essentially completed after 100 minutes and the reaction vessel is flushed, first with $N_2$, and then with air to remove any unreacted propylene oxide. The alkali hydroxypropylcellulose is dissolved in dilute aqueous NaOH at a temperature less than 12.5° C. to yield a nearly colorless solution having a 57 (bfs) viscosity at about 15° C. The solution had a hydroxypropylcellulose content of 8.24% and a NaOH content of 5.08%. The gel/fiber count is too high to count, i.e., extremely high, but with adequate filtration, the hydroxypropylcellulose solution can be spun using conventional technique, as previously disclosed, and as further illustrated in U.S. Pat. Nos. 3,865,918 and 3.670,069, which are hereby incorporated by reference.

EXAMPLE 11

About 25 pounds of wood pulp sheets having an alpha cellulose of 96.8% is steeped in a solution of 19.5% sodium hydroxide at 16.5° C. for 45 minutes. The excess sodium hydroxide is pressed from the sheets; while still under pressure 10% NaOH at 20° C. is admitted to the steeping press. When the level of the 10% lye is above the pulp sheets, the pressure is relaxed and the steeping at this concentration is continued for 45 minutes. The excess lye is removed by reapplication of pressure; the resulting pulp sheets are shredded at 26° C. in the presence of 0.1% Berol Visco 385 surfactant (a shredding aid) for 45 minutes. The resulting alkali cellulose crumbs (65 pounds) have a composition of 33.87% cellulose and 12.05% NaOH. The crumbs are aged for 30 hours at 26° C.

The xanthation of the aged alkali cellulose crumbs is accomplished by adding 2.20 kg of $CS_2$ to the crumbs in a barratte at 26° and atmospheric pressure. The reaction is essentially complete in 45 minutes. After 60 minutes, the reaction vessel is vented and the alkali cellulose xanthate is dissolved in dilute sodium hydroxide at 10°–12° C. for a period of 90 minutes. The dissolving viscosity of the viscose produced is 184 bfs. The compositon of this viscose is 9.44% cellulose, 5.19% NaOH, and 1.63% sulfur. The gel/fiber ratio is 880/656.

EXAMPLE 12

The viscose prepared in Example 11, which is deaired overnight, is extruded through a 60 micron, 1100 hole spinneret into a spinbath containing 6.22% $H_2SO_4$, 19.24% $Na_2SO_4$ and 2.67% $ZnSO_4$ at 59° C. The xanthate ratio of the viscose as spun is 0.323 with a 7.0 maturity. The yarn bundle has a 24-inch immersion in the first bath before entering a second bath of water at 92°–95° C. The takeup speed (centrifugal pot) is 75 meters/minute with 70% stretch being applied during spinning. The resulting yarn cake is washed and finished normally. After drying, the tensile properties obtained are:

|  | Outside | Inside |
|---|---|---|
| Denier | 1725 | 1769 |
| Condition Tenacity (g/d) | 3.0 | 2.62 |
| Cond. Elong. (%) | 12.9 | 13.3 |
| Wet Ten. (g/d) | 1.53 | 1.5 |
| Wet Elong. (%) | 15.1 | 17.1 |

The savings in carbon disulfide, the shorter xanthation time and shorter ripening period derived from using the modified process described above are retained by substitution of the process of this invention and, in addition, the yield of cellulose for xanthation is about equal to that obtained with the conventional process while the yield of alkali cellulose with the above described patented process is about 2–5% less than with the conventional process. Moreover, the process of this invention does not require slurry steeping or repeated handling of the alkali cellulose.

Although the invention is described in detail for the purpose of illustration, it is to be understood that such detail is solely for that purpose and that variations can be made therein by those skilled in the art without departing from the spirit and scope of the invention except as it may be limited by the claims.

I claim:

1. A process for making a regenerated cellulosic material which comprises steeping a cellulosic material in an aqueous solution containing from about 18 to about 22% by weight of an alkali metal hydroxide, pressing the resulting cellulosic material containing absorbed alkali metal hydroxide, to remove excess thereof, and steeping the unaged pressed cellulosic material a second time in an aqueous solution containing from about 10 to about 12% by weight of an alkali metal hydroxide, pressing the unaged cellulosic material a second time, shredding and aging said cellulosic material, derivitizing said cellulosic material, and thereafter regenerating the cellulosic material.

2. The process of claim 1 wherein the cellulose as a sheet is first steeped in an aqueous solution containing 18–19% by weight sodium hydroxide and then steeped in a solution containing about 10–12% by weight of sodium hydroxide.

3. The process of claim 2 wherein said derivitization comprises the steps of reacting the resultant cellulosic material with a derivitizing reactant and dissolving the cellulosic derivative in dilute alkali metal hydroxide and said regeneration comprises contacting the cellulosic derivative with an acid bath.

4. The process of claim 3 wherein said derivitizing reactant is carbon disulfide.

5. The process of claim 3 wherein said derivitizing reactant is a compound selected from the group consisting of ethylene oxide, propylene oxide, methyl chloride or ethyl chloride.

6. The process of claim 5 wherein said compound is propylene oxide.

7. In a process for making a viscose solution which comprises steeping cellulose in an aqueous solution containing about 18–22% by weight of an alkali metal hydroxide, pressing the resulting cellulose containing absorbed alkali metal hydroxide to remove excess thereof, and steeping the unaged pressed cellulose a second time in an aqueous solution containing about 10–12% by weight of an alkali metal hydroxide and thereafter shredding, aging and derivitizing the resulting alkali cellulose with carbon disulfide to produce viscose, the improvement wherein said second steeping step is conducted before any aging takes place, whereby only a single shredding step is required.

8. The process of claim 7 wherein from 18 to 19% by weight of sodium hydroxide is used in said first steeping step.

* * * * *